United States Patent
Gabriel et al.

(10) Patent No.: US 10,711,937 B2
(45) Date of Patent: Jul. 14, 2020

(54) METHOD OF MANUFACTURING A FLUID PRESSURE REDUCTION DEVICE

(71) Applicant: FISHER CONTROLS INTERNATIONAL LLC, Marshalltown, IA (US)

(72) Inventors: Thomas N. Gabriel, Marshalltown, IA (US); Michael W. McCarty, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 3 days.

(21) Appl. No.: 15/887,659

(22) Filed: Feb. 2, 2018

(65) Prior Publication Data
US 2018/0340643 A1 Nov. 29, 2018

Related U.S. Application Data

(60) Provisional application No. 62/511,181, filed on May 25, 2017.

(51) Int. Cl.
*F16L 55/027* (2006.01)
*F16K 47/08* (2006.01)
(Continued)

(52) U.S. Cl.
CPC ........ *F16L 55/02781* (2013.01); *F16K 47/08* (2013.01); *F16K 47/12* (2013.01); *F16L 55/02772* (2013.01); *B33Y 80/00* (2014.12)

(58) Field of Classification Search
CPC .... F16K 47/08; F16K 47/12; F16L 55/02772; F16L 55/02781; F16L 55/027; F16L 55/02763; F16L 55/0279
(Continued)

(56) References Cited

U.S. PATENT DOCUMENTS 3,941,350 A * 3/1976 Kluczynski ............. F16K 47/08
251/127
4,335,744 A * 6/1982 Bey ........................ F16K 17/04
137/522
(Continued)

FOREIGN PATENT DOCUMENTS

DE 102015005611 A1 11/2016
DE 102015218905 A1 3/2017
(Continued)

OTHER PUBLICATIONS

Fisher Cavitrol III One-, Two-, and Three-Stage Trims, Emerson Process Management; Cavitrol III Trims, Product Bulletin, Mar. 2012.
(Continued)

*Primary Examiner* — Mary E McManmon
*Assistant Examiner* — Richard K. Durden
(74) *Attorney, Agent, or Firm* — Marshall, Gerstein & Borun LLP

(57) ABSTRACT

A method of custom manufacturing a fluid pressure reduction device for use in a process control valve. The method includes creating the fluid pressure reduction device using an additive manufacturing technique, which generally includes forming a body and forming a plurality of flow paths in the body. The body has an inner wall and an outer wall spaced radially outward of the inner wall. The flow paths are formed in the body between the inner wall and the outer wall of the body. Each of the flow paths includes an inlet section formed in one of the inner and outer walls, a curved intermediate section, and an outlet section formed in the other of the inner and outer walls.

20 Claims, 8 Drawing Sheets

(51) Int. Cl.
*F16K 47/12* (2006.01)
*B33Y 80/00* (2015.01)

(58) Field of Classification Search
USPC .......................................................... 138/42
See application file for complete search history.

(56) References Cited

U.S. PATENT DOCUMENTS

| | | | |
|---|---|---|---|
| 4,397,331 A | 8/1983 | Medlar | |
| RE31,570 E * | 5/1984 | Drexel | G01F 1/42 |
| | | | 138/42 |
| 4,617,963 A | 10/1986 | Stares | |
| 5,020,571 A | 6/1991 | Tartaglia et al. | |
| 5,390,896 A * | 2/1995 | Smirl | F16K 47/08 |
| | | | 137/625.3 |
| 6,782,920 B2 * | 8/2004 | Steinke | F16K 47/08 |
| | | | 137/625.3 |
| 6,935,370 B2 | 8/2005 | McCarty et al. | |
| 6,935,615 B2 | 8/2005 | McCarty | |
| 7,069,950 B1 * | 7/2006 | Bittner | F16K 47/08 |
| | | | 137/625.37 |
| 8,826,938 B2 | 9/2014 | Moore | |
| 2003/0034074 A1 * | 2/2003 | McCarty | F16K 47/04 |
| | | | 137/625.3 |
| 2005/0104023 A1 * | 5/2005 | Morton | F16K 47/08 |
| | | | 251/206 |
| 2009/0026395 A1 * | 1/2009 | Perrault | F16K 47/08 |
| | | | 251/127 |
| 2010/0300542 A1 | 12/2010 | Haines et al. | |
| 2016/0102781 A1 * | 4/2016 | Glaun | F16K 47/04 |
| | | | 137/594 |
| 2016/0341335 A1 | 11/2016 | Adams et al. | |
| 2017/0067579 A1 | 3/2017 | Glaun | |
| 2018/0283580 A1 * | 10/2018 | Sander | F16K 47/06 |

FOREIGN PATENT DOCUMENTS

| | | |
|---|---|---|
| EP | 2798247 A1 | 11/2014 |
| GB | 2207528 A | 2/1989 |
| WO | WO-2016187246 A1 | 11/2016 |
| WO | WO-2017161940 A1 * | 9/2017 ............. F16K 47/02 |

OTHER PUBLICATIONS

International Search Report received for PCT/US2018/031743, dated Jul. 19, 2018.
Written Opinion received for PCT/US2018/031743, dated Jul. 19, 2018.
International Search Report and Written Opinion for International Application No. PCT/US2018/033076, dated Oct. 24, 2018.

* cited by examiner

METHOD OF MANUFACTURING A FLUID PRESSURE REDUCTION DEVICE

FIELD OF THE DISCLOSURE

The present disclosure generally relates to fluid pressure reduction devices, and, more particularly, to a method of manufacturing a device that more effectively and efficiently reduces fluid pressure in a process control system.

BACKGROUND

In process control systems, such as distributed or scalable process control systems commonly found in chemical, petroleum, power generation, or other industrial processes, it is often necessary to reduce the pressure of a fluid. However, pressure reduction typically leads to increased levels of unwanted noise and/or vibration, as discussed in the Background section of U.S. Pat. No. 6,935,370 ("the '370 Patent"). Thus, process control systems often employ flow restriction devices that aim to reduce fluid pressure in a manner that does not lead to increased levels of noise and/or vibration. Such flow restriction devices may include, for example, flow control valves, fluid regulators, valve cages, diffusers, silencers.

The '370 Patent illustrates several different examples of fluid pressure restriction devices each taking the form of a plurality of stacked disks that, when employed in a fluid flow control valve, reduce the pressure of a fluid flowing therethrough. One example, illustrated in FIG. 5 of the '370 Patent, features a plurality of stacked annular disks 100 rotated relative to one another to create flow paths 62 that each provide multi-stage pressure reduction. Each disk 60 of the stack 100 has a laser cut profile defining a horizontal, spiral flow path 62 that extends from an inlet section 68, through an intermediate section 70 formed of a series of flat leg portions and including restrictions 74, 76, and to an outlet section 72 having a larger cross-sectional area than the inlet section 68. Another example, illustrated in FIG. 8 of the '370 Patent, features an annular disk 130 that defines intersecting fluid flow paths 136, 138 so that fluid flowing therein collides, thereby releasing energy and reducing fluid pressure.

SUMMARY

In accordance with a first exemplary aspect of the present invention, a fluid pressure reduction device is provided for use in a fluid flow control device. The fluid pressure reduction device includes a unitary body, a plurality of first flow paths, and a plurality of second flow paths. The unitary body has an inner wall and an outer wall spaced radially outward of the inner wall. The first flow paths are defined between the inner wall and the outer wall of the body. Each of the first flow paths includes an inlet section, an outlet section, and a curved intermediate section between the inlet and outlet sections, wherein the inlet section of each of the first flow paths is oriented along a first inlet axis. The second flow paths are defined between the inner wall and the outer wall of the body. Each of the second flow paths includes an inlet section, an outlet section, and a curved intermediate section between the inlet and outlet sections, wherein the inlet section of each of the second flow paths is oriented along a second inlet axis that is parallel to but spaced from the first inlet axis.

In accordance with a second exemplary aspect of the present invention, a fluid pressure reduction device is provided for use in a fluid flow control device. The fluid pressure reduction device includes a unitary body, a plurality of first flow paths, and a plurality of second flow paths. The unitary body includes a central opening and a substantially cylindrical perimeter surrounding the central opening, the central opening defining a central longitudinal axis, and the perimeter having an inner wall and an outer wall spaced radially outward of the inner wall. The first flow paths are defined between the inner wall and the outer wall of the body. Each of the first flow paths includes an inlet section, an outlet section, and a curved intermediate section between the inlet and outlet sections, wherein the inlet section of each of the first flow paths is oriented along a first inlet axis that is perpendicular to the central longitudinal axis. The second flow paths are defined between the inner wall and the outer wall of the body. Each of the second flow paths includes an inlet section, an outlet section, and a curved intermediate section between the inlet and outlet sections, wherein the inlet section of each of the second flow paths is oriented along a second inlet axis that is parallel to but spaced from the first inlet axis.

In accordance with a third exemplary aspect of the present invention, a method of custom manufacturing a fluid pressure reduction device for use in a process control valve. The method includes creating the fluid pressure reduction device using an additive manufacturing technique, which generally includes forming a body and forming a plurality of flow paths in the body. The body has an inner wall and an outer wall spaced radially outward of the inner wall. The flow paths are formed in the body between the inner wall and the outer wall of the body. Each of the flow paths includes an inlet section formed in one of the inner and outer walls, a curved intermediate section, and an outlet section formed in the other of the inner and outer walls.

In further accordance with any one or more of the foregoing first, second, and third exemplary aspects, a fluid pressure reduction device and/or a method of manufacturing a fluid pressure reduction device may include any one or more of the following further preferred forms.

In one preferred form, the inlet sections of the first flow paths and the inlet sections of the second flow paths are formed in the inner wall, and the outlet sections of the first flow paths and the outlet sections of the second flow paths are formed in the outer wall.

In another preferred form, the unitary body includes a central opening and a substantially cylindrical perimeter surrounding the central opening, the central opening defining a central longitudinal axis of the unitary body, and the first and second axes are perpendicular to the central longitudinal axis.

In another preferred form, the plurality of second flow paths are rotated about a central longitudinal axis relative to the plurality of first flow paths, such that the plurality of second flow paths are offset from the plurality of first flow paths.

In another preferred form, for each of the first and second flow paths, the inlet section has a cross-sectional area that is smaller than a cross-sectional area of a respective outlet section associated with the inlet section.

In another preferred form, the curved intermediate section of each of the first and second flow paths includes a pair of loops each including a component that is parallel to a central longitudinal axis of the unitary body.

In another preferred form, the outlet section of each of the first flow paths is oriented along a first outlet axis that is parallel to but spaced from the first inlet axis of a respective inlet section.

In another preferred form, adjacent flow paths of the plurality of first and second flow paths share a common inlet and a common outlet.

In another preferred form, the curved intermediate section of each of the first and second flow paths includes a gradual, semi-circular shape that does not include any abrupt directional changes.

In another preferred form, each of the first flow paths intersects with one or more adjacent first flow paths, and each of the second flow paths intersects with one or more adjacent second flow paths.

In another preferred form, the additive manufacturing technique includes 3D printing.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

The present disclosure is generally directed to a method of manufacturing a device that more efficiently and effectively reduces fluid pressure than conventional fluid pressure reduction devices (e.g., the stacked disks 100 described above) and, at the same time, is easier and less costly to manufacture than such conventional fluid pressure reduction devices. The method described herein utilizes cutting edge manufacturing techniques, e.g., additive manufacturing, to facilitate custom manufacturing of a fluid pressure reduction device such that any number of different, and complex, flow paths can be developed and incorporated into a unitary or single body, depending upon the given application.

Figure 1:
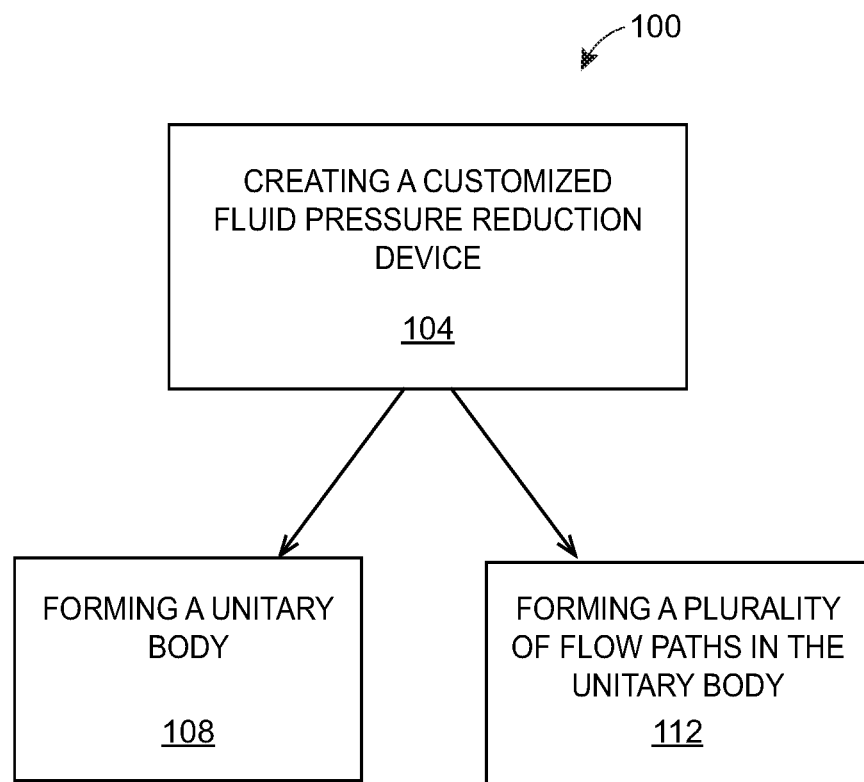
FIG. 1 is a schematic diagram of one example of a process or method according to the teachings of the present disclosure for manufacturing a fluid pressure reduction device.

FIG. 1 is a diagram of an example of a method or process 100 according to the teachings of the present invention. The method or process 100 schematically depicted in FIG. 1 is a method or process of custom manufacturing a fluid pressure reduction device such as a valve trim component. Like the conventional fluid pressure reduction devices described above (e.g., the stack of disks 100), fluid pressure reduction devices manufactured according to the method or process 100 are configured to reduce the pressure of the fluid flowing therethrough, but, as described above, are more effective and efficient at doing so and, at the same time, easier and less costly to manufacture.

More specifically, the method 100 includes the act 104 of creating a customized fluid pressure reduction device, using an additive manufacturing technique, based on the given application. The additive manufacturing technique may be any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

The act 104 of creating the customized fluid pressure reduction device includes forming a unitary or single body (act 108) and forming a plurality of flow paths in the unitary or single body (act 112). The unitary body can be made of one or more suitable materials, such as, for example, stainless steel, aluminum, various alloys, and, by virtue of being customizable, can be any number of different shapes and/or sizes. As an example, the unitary body may take the form of a hollow cylinder defined by an inner wall and an outer wall spaced radially outward of the inner wall. The flow paths formed in the body are generally configured to reduce the pressure of a fluid flowing therethrough. As discussed above, the usage of additive manufacturing techniques to custom manufacture the fluid pressure reduction device allows the flow paths to be formed based upon the desired application. In other words, the flow paths are customizable based upon the desired application. By virtue of being customizable, the flow paths can be unique and complex, have any number of different lengths, have any number of different sizes and/or shapes in cross-section, and/or be arranged in any number of different patterns. As a result, one or more of the flow paths may be formed to intersect with one or more other flow paths, one or more of the flow paths may be formed to include or define multiple different pressure stages (e.g., a first pressure stage and a second pressure stage where pressure is less than the pressure in the first pressure stage), one or more of the flow paths may be non-horizontal (i.e., include vertical components, such that the flow path is not solely horizontal), one or more of the flow paths can vary in shape and/or size as the fluid passes therethrough, one or more of the flow paths can vary from one or more other flow paths, the length(s) of one or more flow paths can be maximized, the flow paths can be staggered or offset from one another (either horizontally or vertically) throughout the unitary body, or combinations thereof.

It will be appreciated that the act 104 (and the acts 108, 112) can be performed any number of different times. The act 104 can, for example, be performed multiple times so as to create multiple fluid pressure reduction devices for use in a single process control valve, with each fluid pressure reduction device created for a specific application. The act 104 can, alternatively or additionally, be performed multiple times so as to create fluid pressure reduction devices for use in multiple similar or different process control valves.

FIGS. 2A-2E illustrate a first example of a fluid pressure reduction device 200 custom manufactured using the method or process 100. The fluid pressure reduction device 200 in this example takes the form of a valve cage that can be utilized in a process control valve. The fluid pressure reduction device 200 has a single or unitary body 204 and a plurality of flow paths 208 formed or defined in the unitary body 204. The flow paths 208 are formed in the unitary body 204 in a manner that maximizes their length, thereby maximizing (or at least enhancing) the pressure reduction capabilities of the device 200.

The body 204 has a central opening 212 and a substantially cylindrical perimeter 216 surrounding the central opening 212. The central opening 212 extends along a central longitudinal axis 218 and is sized to receive a valve plug (not shown) that is movably disposed therein to control fluid flow through the process control valve. The substantially cylindrical perimeter 216 is defined by an inner wall 220 and an outer wall 224 that is spaced radially outward of the inner wall 220.

Figure 2A:
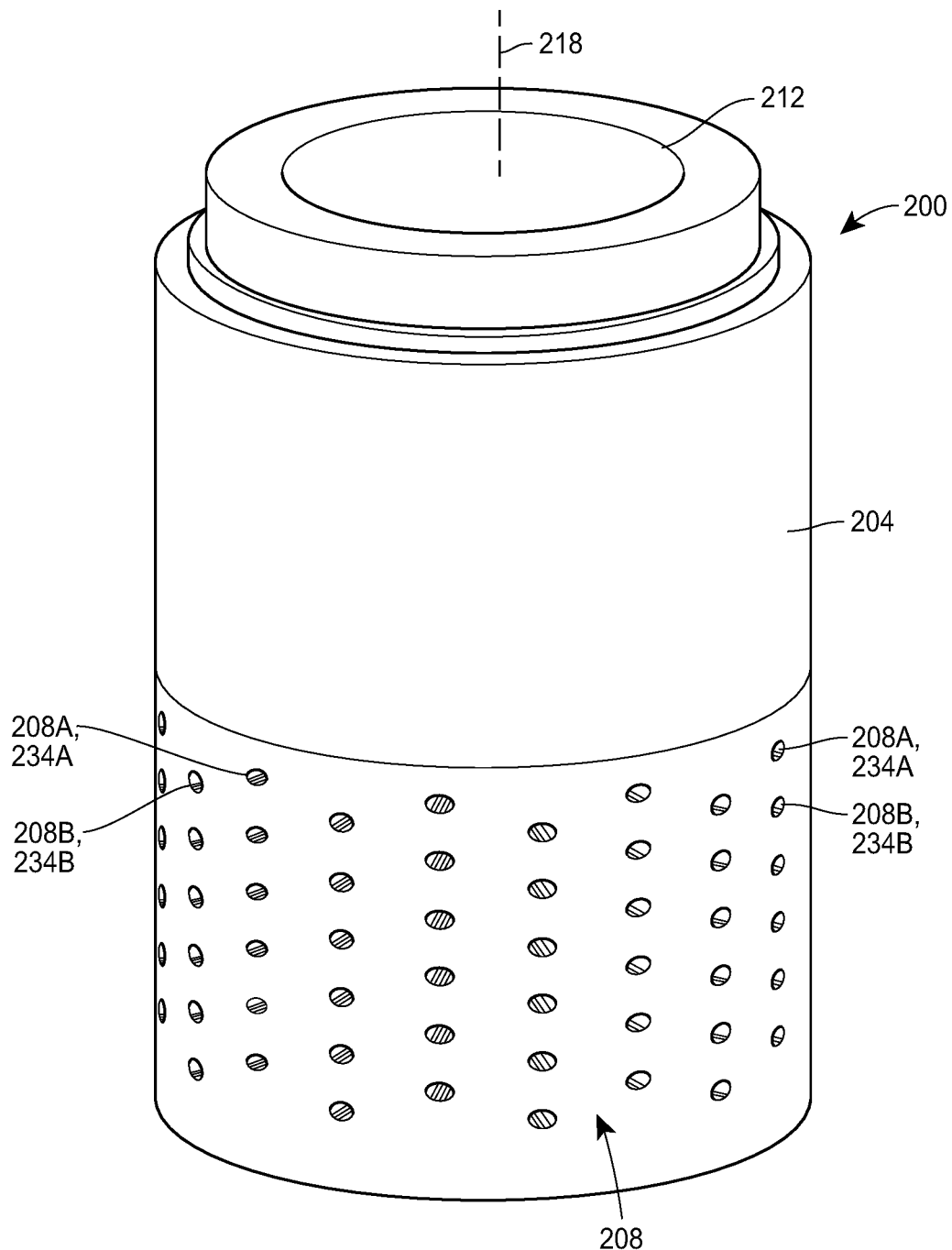
FIG. 2A is a perspective view of a first example of a fluid pressure reduction device manufactured according to the process of FIG. 1.
Figure 2B:
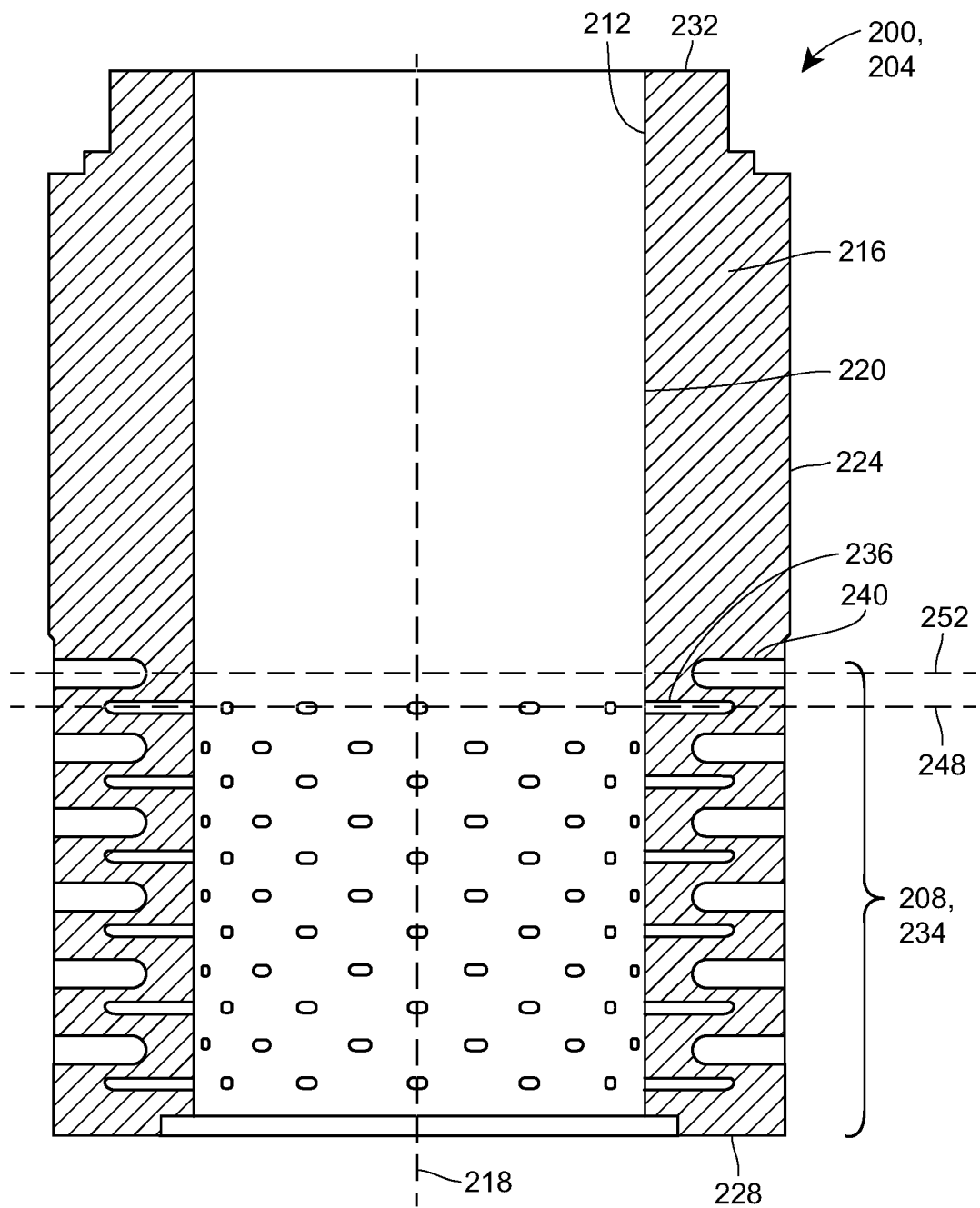
FIG. 2B is a cross-sectional view of the fluid pressure reduction device of FIG. 2A.
Figure 2C:
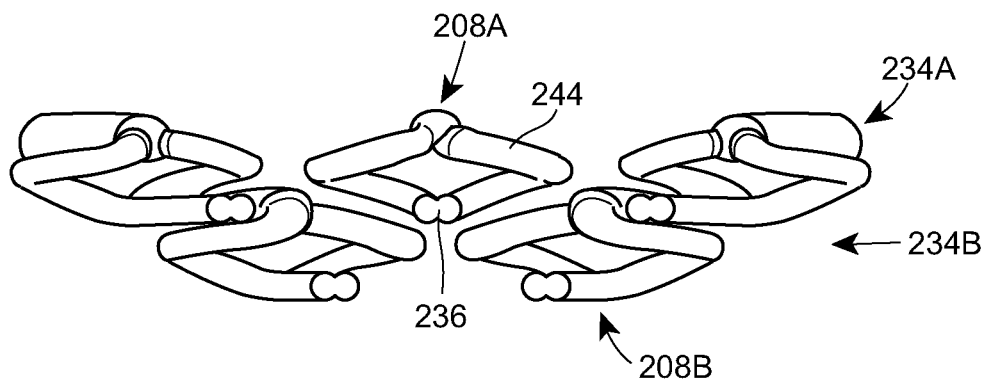
FIG. 2C illustrates two rows of flow paths as viewed from an inner diameter of the fluid pressure reduction device of FIG. 2A when the remaining components of the fluid pressure reduction device are removed.
Figure 2D:
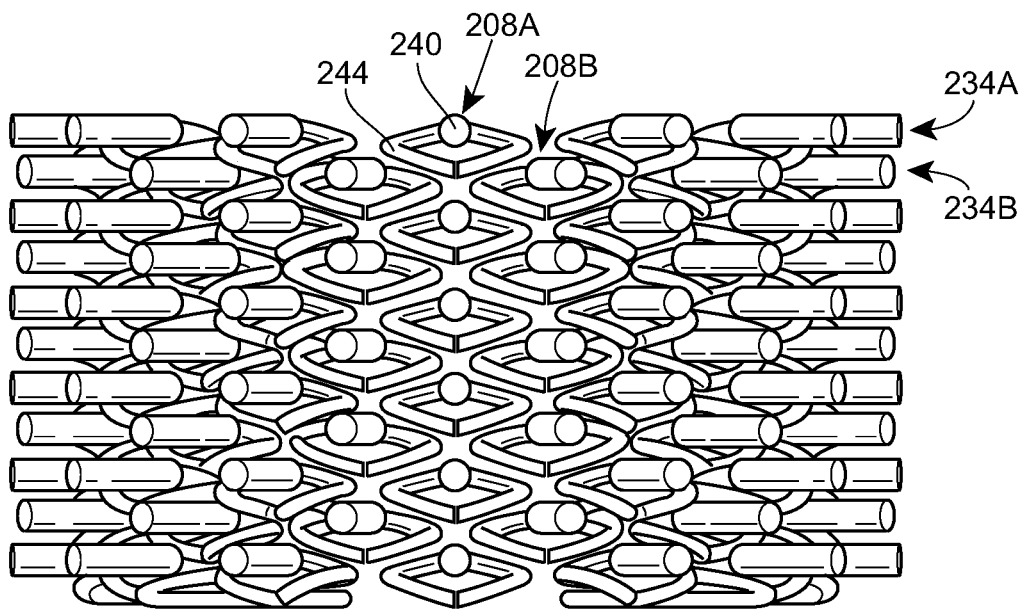
FIG. 2D illustrates six rows of flow paths as viewed from an outer diameter of the fluid pressure reduction device of FIG. 2A when the remaining components of the fluid pressure reduction device are removed.

As best illustrated in FIG. 2B, the flow paths 208 are formed in a portion of the substantially cylindrical perimeter 216. The degree to which the flow paths 208 span the perimeter 216 will generally depend on the travel extent of the valve plug disposed in the fluid pressure reduction device 200. In this example, the flow paths 208 span only approximately 50% of the perimeter 216, with the flow paths 208 formed only between a bottom end 228 of the perimeter 216 and a portion of the perimeter 216 that is approximately halfway between the bottom end 228 and a top end 232 of the perimeter 216. In other examples, flow paths can be added or removed such that the flow paths 208 can span more or less of the perimeter 216, respectively. As an example, additional rows of flow paths 208 can be added such that the flow paths 208 span the entire perimeter 216 (i.e., can be formed between the bottom end 228 and the top end 232).

As best illustrated in FIGS. 2A-2D, the flow paths 208 are circumferentially arranged around the central opening 212. The flow paths 208 are arranged in a plurality of rows 234 within the body 204, with alternating rows 234 of flow paths 208 staggered or offset from one another. Thus, as an example, flow paths 208A in row 234A are staggered or offset from flow paths 208B in row 234B, which is adjacent to row 234A. Staggering the flow paths 208 in this manner helps to achieve a balanced fluid flow throughout the fluid pressure reduction device 200, though it is not necessary that the flow paths 208 be staggered in this manner (or at all).

Figure 2E:
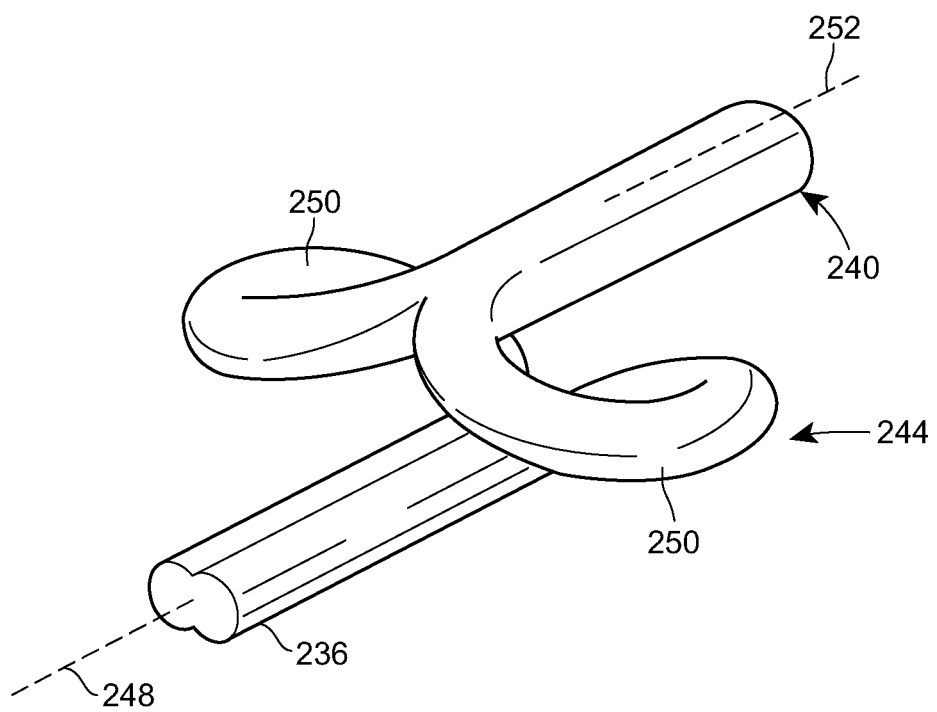
FIG. 2E illustrates one flow path of the fluid pressure reduction device of FIG. 2A.

As illustrated, each of the flow paths 208 has a substantially circular shape in cross-section and includes an inlet section 236, an outlet section 240, and a curved intermediate section 244 extending between the inlet and outlet sections 236, 240. The inlet section 236 is formed in and proximate the inner wall 220 (and, thus, proximate the central opening 212), and is oriented along a first axis (e.g., axis 248) that is substantially perpendicular (e.g., perpendicular) to the longitudinal axis 218. The outlet section 240 is formed in and proximate the outer wall 224. The intermediate section 244 in this example takes the form of two identical spiral loops 250 that each connect the inlet section 236 to the outlet section 240 (and vice-versa). As best illustrated in FIGS. 2B and 2E, each loop 250 extends outward and upward from the inlet section 236 before extending inward and upward to the outlet section 240, such that the outlet section 240 is radially aligned with but located upward of the inlet section 236 (i.e., the outlet section 240 is closer to the top end 232 than the inlet section 236). Put another way, the outlet section 240 is oriented along a second axis (e.g., axis 252) that is substantially perpendicular (e.g., perpendicular) to the longitudinal axis 218 and parallel to but vertically above the first axis (e.g., the axis 248). In this manner, the loops 250 serve to increase (and maximize) the length of each of the flow paths 208. As also illustrated in FIGS. 2B and 2E, each loop 250 has a cross-sectional flow area that increases (e.g., gradually increases) as the loop 250 travels from the inlet section 236 to the outlet section 240. Thus, the outlet section 240 has a cross-sectional area that is greater than a cross-sectional area of the inlet section 236. In this example, the cross-sectional area of the outlet section 240 is approximately 3 times the cross-sectional area of the inlet section 236.

In other examples, the inlet section 236 can be formed in and proximate the outer wall 224 (instead of the inner wall 220), and the outlet section 240 can be formed in and proximate the inner wall 220 (instead of the outer wall 224), such that fluid flows in the opposite direction through the fluid pressure reduction device 200. Moreover, in other examples, the loops 250 can extend differently than the loops 250 illustrated in FIGS. 2B-2E. As an example, the loops 250 can extend downward to the outlet section 240, such that the outlet section 240 is located below the inlet section 236 (and the second axis 252 is located below the first axis 248). Alternatively or additionally, the cross-sectional areas of the inlet and outlet sections 236, 240, respectively, can vary. In some cases, the ratio of the cross-sectional area of the outlet section 240 to the cross-sectional area of the inlet section 236 can vary from the 3:1 ratio described herein. As an example, the ratio can be 4:1, 2:1, or some other value. In other cases, the cross-sectional area of the inlet section 236 can be equal to the cross-sectional area of the outlet section 240.

In any case, when configured as described above, each of the flow paths 208 defines multiple stages of pressure reduction. More particularly, each of the flow paths 208 defines three stages of pressure reduction, with the first pressure stage defined by the inlet section 236, the second pressure stage defined by the intermediate section 244 (i.e., the loops 250), and the third pressure stage defined by the end of the intermediate section 244 and the outlet section 240. When the device 200 is in operation (in a valve body of a process control valve), and the valve plug is moved to a partially open position (exposing some of the inlet sections 236) or a fully open position (exposing all of the inlet sections 236), fluid having a first fluid pressure flows into the exposed inlet sections 236 of the flow paths 208 via the central opening 212. The fluid will then flow into the intermediate section 244 of each flow path 208. The intermediate section 244 distributes the fluid into the two loops 250, such that the fluid is divided or separated and travels around the loops 250. As this happens, the loops 250 force the flow to drag across or along an outer profile thereof while the fluid travels upward to the outlet section 240, such that gravity acts on the fluid, thereby reducing the velocity of the fluid, reducing the kinetic energy of the fluid, and, in turn, reducing the pressure of the fluid to a second fluid pressure that is less than the first fluid pressure. As the loops 250 converge toward the common outlet section 240, thereby rejoining the separated fluid, fluid that has passed through one of the loops 250 will collide with fluid that has through the other loop 250 of each flow path 208. The fluid collisions dissipate energy in the fluid, effecting a further reduction in the pressure of the fluid, i.e., reducing the pressure of the fluid to a third fluid pressure that is less than the second fluid pressure.

Figure 3A:
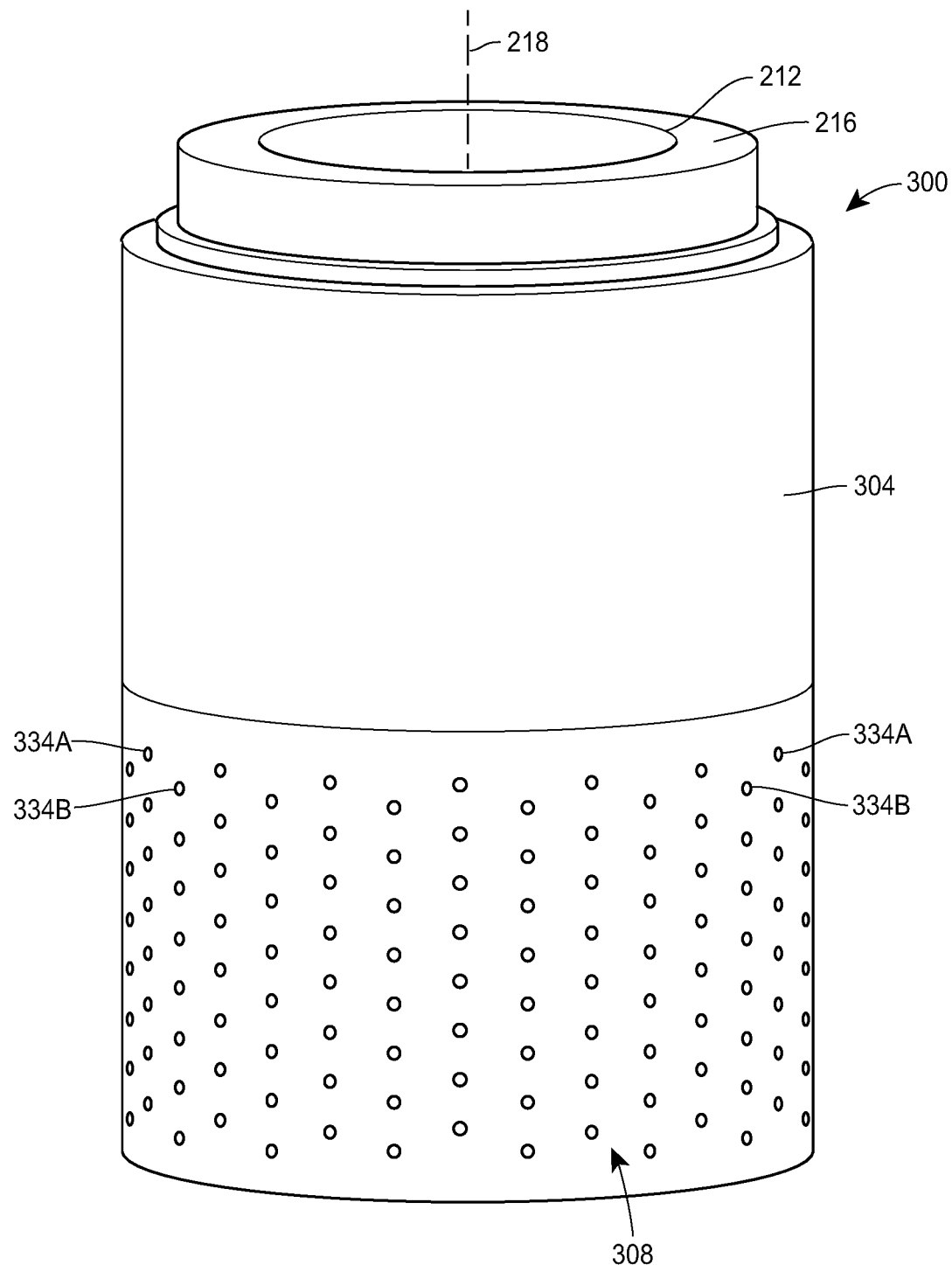
FIG. 3A is a perspective view of a second example of a fluid pressure reduction device manufactured according to the process of FIG. 1.
Figure 3B:
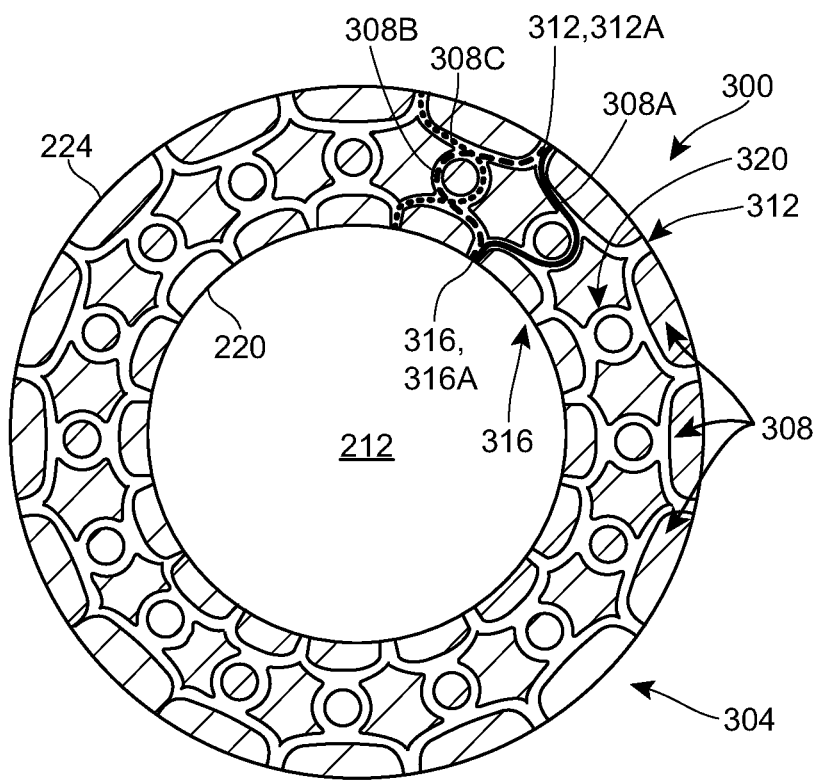
FIG. 3B is a cross-sectional view of the fluid pressure reduction device of FIG. 3A.
Figure 3C:
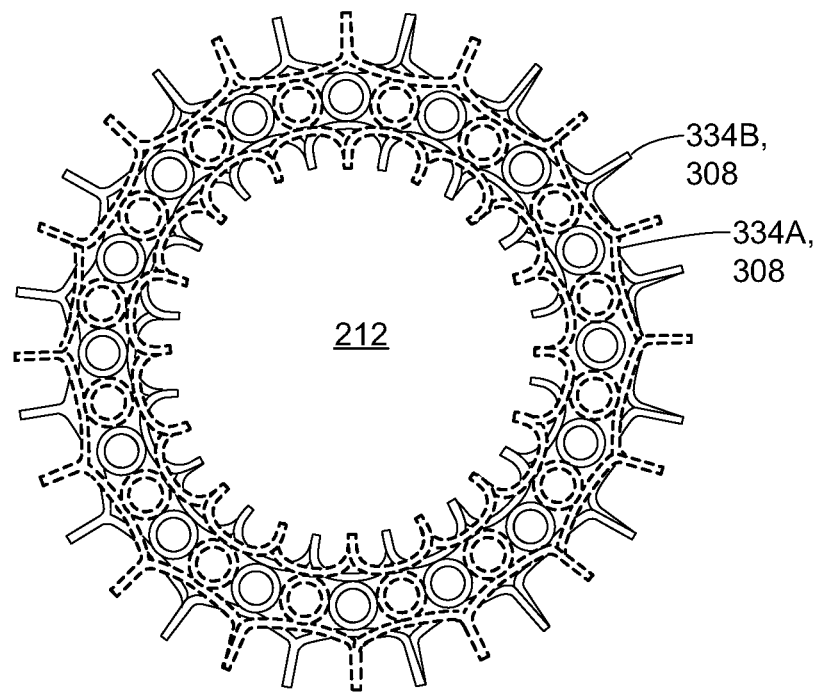
FIG. 3C illustrates a plurality of flow paths of the fluid pressure reduction device of FIG. 3A when the remaining components of the fluid pressure reduction device are removed.

FIGS. 3A-3C illustrate a second example of a fluid pressure reduction device 300 custom manufactured using the method or process 100. The fluid pressure reduction device 300 in this example also takes the form of a valve cage that can be utilized in a process control valve. Like the pressure reduction device 200, the fluid pressure reduction device 300 has a single or unitary body 304 and a plurality of flow paths 308 formed or defined in the unitary body 304 in a manner that maximizes their length, thereby maximizing (or at least enhancing) the pressure capabilities of the device 300.

The single or unitary body 304 is substantially identical to the single or unitary body 204 discussed above, with common reference numerals used to refer to common components. The plurality of flow paths 308 are, like the flow paths 208, divided into rows that are staggered or offset relative to one another (e.g., row 334A of flow paths 308 is offset from row 334B of flow paths 308), but the flow paths 308 differ from the plurality of flow paths 208 in the manner discussed below.

Unlike the pressure reduction device 200, the fluid pressure reduction device 300 includes common inlet sections 312 and common outlet sections 316 for associated (e.g., adjacent) flow paths 308. Each inlet section 312 serves as the common inlet section for two associated (e.g., adjacent) flow paths 308, while each outlet section 316 serves as the common outlet section for the same two associated (e.g., adjacent) flow paths 308. As an example, inlet section 312A serves as the common inlet section for flow paths 308A, 308B, which are adjacent one another, while outlet section 316A serves as the common outlet section for the flow paths 308A, 308B.

Each flow path 308 then includes an intermediate section 320 that extends between one of the common inlet sections 312 and one of the common outlet sections 316. As illustrated, the intermediate section 320 of each flow path 308 has a gradual, semi-circular shape that does not include any abrupt directional changes (which, as is known in the art, tend to cause flow unbalance, reduce passage efficiency, and, in some cases, flashing and cavitation).

So configured, each flow path 308 has a gradual curved flow path that intersects with one or more adjacent flow paths 308, such that fluid flowing through one flow path 308 collides with fluid flowing through one or more adjacent flow paths 308, thereby dissipating energy in the fluid and reducing fluid pressure. In this example, each flow path 308 intersects with one adjacent flow path 308 on two occasions—once when the flow transitions from the inlet section 312 to the intermediate section 320, and again when the flow transitions from the intermediate section 320. For example, fluid flowing via flow path 308B will intersect with fluid flowing via flow path 308C as the fluid in each of flow paths 308B, 308C transitions from the respective inlet section 312 to the respective intermediate section 320, and again as the fluid in each of flow paths 308B, 308C transitions from the respective intermediate section 320 to the respective outlet section 316. In other examples, however, each flow path 308 can intersect with additional or different flow paths 308, can intersect with one or more flow paths 308 only once or more than two times, and/or can intersect with one or more flow paths 308 at different locations in the body 304.

Figure 4:
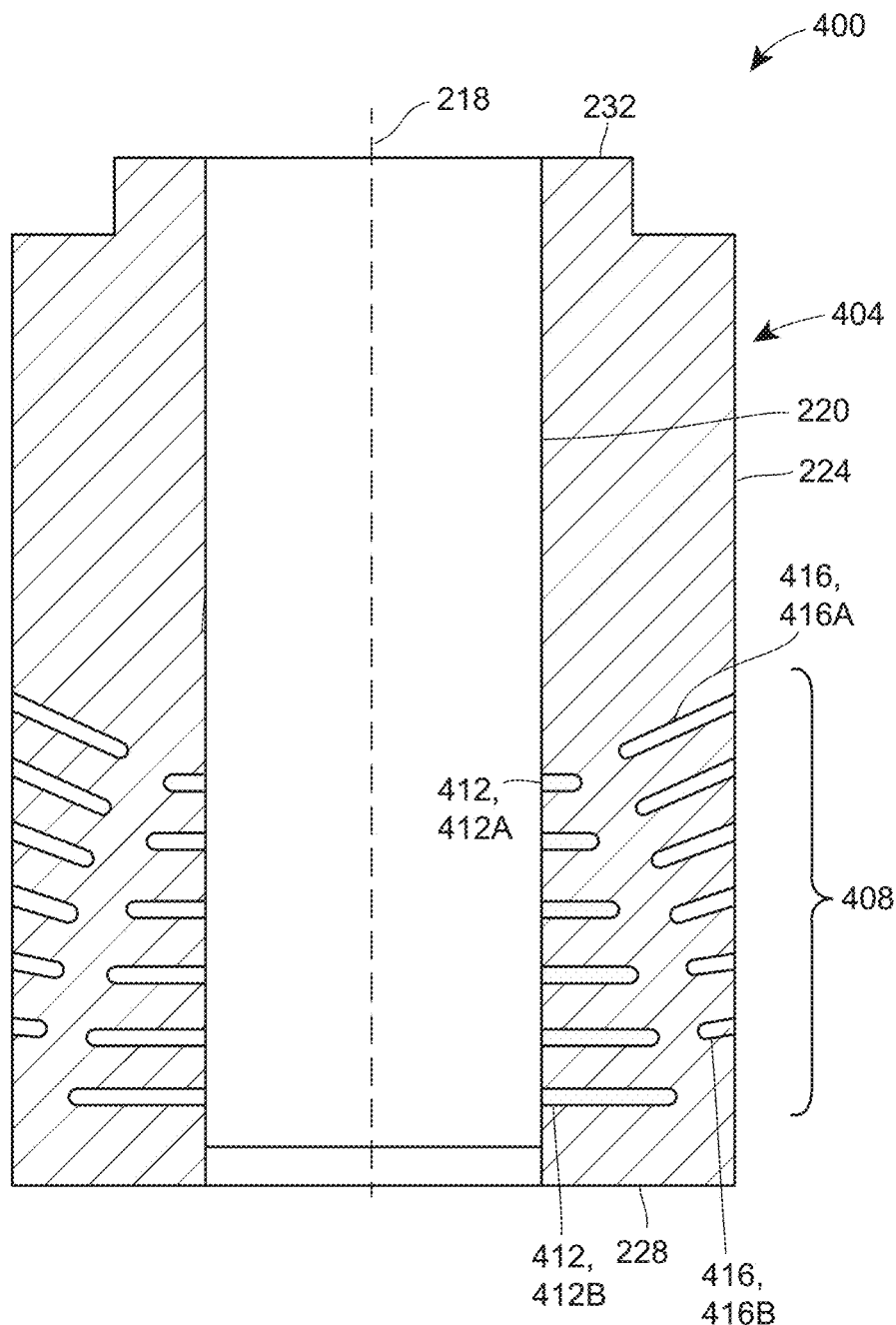
FIG. 4 is a cross-sectional view of a third example of a fluid pressure reduction device manufactured according to the process of FIG. 1.

FIG. 4 illustrates a third example of a fluid pressure reduction device 400 custom manufactured using the method or process 100. The fluid pressure reduction device 400 in this example also takes the form of a valve cage that can be utilized in a process control valve. Like the pressure reduction device 200, the fluid pressure reduction device 400 has a single or unitary body 404 and a plurality of flow paths 408 formed or defined in the unitary body 404.

The single or unitary body 404 is substantially identical to the single or unitary body 204 discussed above, with common reference numerals used to refer to common components. The plurality of flow paths 408, however, differ from the plurality of flow paths 208 in that (1) inlet sections 412 of the flow paths 408 decrease in length as the flow paths 408 move away from the bottom end 228 of the body 404 and toward the top end 232 of the body 404, (2) outlet sections 416 of the flow paths 408 increase in length as the flow paths 408 move away from the bottom end 228 of the body 404 and toward the top end 232 of the body 404, and (3) the orientation of the outlet sections 416 relative to the longitudinal axis 218 changes (in this case, the angle therebetween decreases) as the flow paths 408 move away from the bottom end 228 of the body 404 and toward the top end 232 of the body 404. As a result, an inlet section 412A will have a smaller travel range than an inlet section 4128 that is closer to the bottom end 232, and an outlet section 416A (e.g., associated with the inlet section 412A) will have a greater travel range than an outlet section 4168 that is closer to the bottom end 228.

It will be appreciated that when fluid flows through the flow paths 408, the flow paths 408 reduce the pressure of the fluid in a similar manner as the flow paths 208 described above. However, in some cases, because the flow paths 408 utilize more of the profile of the device 400 than the flow paths 208 (utilize of the profile of the device 200), and because the flow paths 408 have a greater vertical component than the flow paths 208, the device 400 may actually be more effective in reducing the pressure of the fluid than the device 200. And beneficially, despite the fact that the outlet sections 416 are more spread out than the outlet sections 240 (to help achieve the pressure reduction), the device 400 does not require the use of a larger actuator (i.e., an actuator with a longer travel stroke), because the positioning of the inlet sections 412 is consistent with the positioning of the outlet sections 236.

Preferred aspects of this invention are described herein, including the best mode or modes known to the inventors for carrying out the invention. Although numerous examples are shown and described herein, those of skill in the art will readily understand that details of the various aspects need not be mutually exclusive. Instead, those of skill in the art upon reading the teachings herein should be able to combine one or more features of one aspect with one or more features of the remaining aspects. Further, it also should be understood that the illustrated aspects are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspect or aspects of the invention, and do not pose a limitation on the scope of the invention. No language in the specification should be construed as indicating any non-claimed element as essential to the practice of the invention.

The invention claimed is:

1. A fluid pressure reduction device for use in a fluid flow control device, the fluid pressure reduction device comprising:
    a unitary body having an inner wall and an outer wall spaced radially outward of the inner wall;
    a plurality of first flow paths defined between the inner wall and the outer wall of the body, each of the first flow paths comprising an inlet section, an outlet section, and a curved intermediate section between the inlet and outlet sections, wherein the inlet section of each of the first flow paths is oriented along a respective first inlet axis, and wherein the first inlet axes are arranged along a first plane; and
    a plurality of second flow paths defined between the inner wall and the outer wall of the body, each of the second flow paths comprising an inlet section, an outlet section, and a curved intermediate section between the inlet and outlet sections, wherein the inlet section of each of the second flow paths is oriented along a respective second inlet axis, and wherein the second inlet axes are arranged along a second plane that is parallel to but spaced from the first plane,
    wherein the curved intermediate section of each of the first and second flow paths comprises a pair of loops, and wherein each of the loops has a first portion that extends outward and upward from the respective inlet section, and a second portion that is connected to the first portion and extends inward and upward into the respective outlet section.

2. The fluid pressure reduction device of claim 1, wherein the inlet sections of the first flow paths and the inlet sections of the second flow paths are formed in the inner wall, and wherein the outlet sections of the first flow paths and the outlet sections of the second flow paths are formed in the outer wall.

3. The fluid pressure reduction device of claim 1, wherein the unitary body comprises a central opening and a perimeter surrounding the central opening, the central opening defining a central longitudinal axis of the unitary body, and wherein the first and second planes are perpendicular to the central longitudinal axis.

4. The fluid pressure reduction device of claim 3, wherein the plurality of second flow paths are rotated about the central longitudinal axis relative to the plurality of first flow paths, such that the plurality of second flow paths are offset from the plurality of first flow paths.

5. The fluid pressure reduction device of claim 1, wherein for each of the first and second flow paths, the inlet section has a cross-sectional area that is smaller than a cross-sectional area of a respective outlet section associated with the inlet section.

6. The fluid pressure reduction device of claim 1, wherein the outlet section of each of the first flow paths is oriented along a respective first outlet axis that is parallel to but spaced from the respective first inlet axis of a respective inlet section.

7. The fluid pressure reduction device of claim 1, wherein the curved intermediate section of each of the first and second flow paths consists of the pair of loops.

8. A fluid pressure reduction device for use in a fluid flow control device, the fluid pressure reduction device comprising:
    a unitary body comprising a central opening and a perimeter surrounding the central opening, the central opening defining a central longitudinal axis, and the perimeter having an inner wall and an outer wall spaced radially outward of the inner wall;
    a plurality of first flow paths defined between the inner wall and the outer wall of the body, each of the first flow paths comprising an inlet section, an outlet section, and a curved intermediate section between the inlet and outlet sections, wherein the inlet section of each of the first flow paths is oriented along a respective first inlet axis, and wherein the first inlet axes are arranged along a first plane that is perpendicular to the central longitudinal axis; and
    a plurality of second flow paths defined between the inner wall and the outer wall of the body, each of the second flow paths comprising an inlet section, an outlet section, and a curved intermediate section between the inlet and outlet sections, wherein the inlet section of each of the second flow paths is oriented along a respective second inlet axis, and wherein the second inlet axes are arranged along a second plane that is parallel to but spaced from the first plane,
    wherein the curved intermediate section of each of the first and second flow paths comprises a pair of loops, and wherein each of the loops has a first portion that extends outward and upward from the respective inlet section, and a second portion that is connected to the first portion and extends inward and upward into the respective outlet section.

9. The fluid pressure reduction device of claim 8, wherein the plurality of second flow paths are rotated about the central longitudinal axis relative to the plurality of first flow paths, such that the plurality of second flow paths are offset from the plurality of first flow paths.

10. The fluid pressure reduction device of claim 8, wherein for each of the first and second flow paths, the inlet section has a cross-sectional area that is smaller than a cross-sectional area of a respective outlet section associated with the inlet section.

11. The fluid pressure reduction device of claim 8, wherein the outlet section of each of the first flow paths is oriented along a respective first outlet axis that is parallel to but spaced from the respective first inlet axis of a respective inlet section.

12. The fluid pressure reduction device of claim 8, wherein the curved intermediate section of each of the first and second flow paths consists of the pair of loops.

13. A method of manufacturing, comprising:
    creating a fluid pressure reduction device using an additive manufacturing technique, the creating comprising:
        forming a body having an inner wall and an outer wall spaced radially outward of the inner wall; and
        forming a plurality of flow paths in the body between the inner wall and the outer wall of the body, each of the flow paths comprising an inlet section formed in the inner wall, an outlet section formed in the outer wall, and a curved intermediate section between the inlet and outlet sections,
    wherein the curved intermediate section of each of the flow paths comprises a pair of loops, and wherein each of the loops has a first portion that extends outward and upward from the respective inlet section, and a second portion that is connected to the first portion and extends inward and upward into the respective outlet section.

14. The method of claim 13, wherein the additive manufacturing technique comprises 3D printing.

15. The method of claim 13, wherein the plurality of flow paths comprise a plurality of first flow paths and a plurality of second flow paths, wherein the inlet section of each of the first flow paths is oriented along a respective first inlet axis, and wherein the inlet section of each of the second flow paths is oriented along a respective second inlet axis.

16. The method of claim 15, wherein the first inlet axes are arranged along a first plane, and wherein the second inlet axes are arranged along a second plane that is parallel to but spaced from the first plane.

17. The method of claim 16, wherein the body comprises a unitary body, wherein the unitary body comprises a central opening and a perimeter surrounding the central opening, the central opening defining a central longitudinal axis of the unitary body, and where in the first and second planes are perpendicular to the central longitudinal axis of the unitary body.

18. The method of claim 17, wherein the plurality of second flow paths are rotated about the central longitudinal axis relative to the plurality of first flow paths, such that the plurality of second flow paths are offset from the plurality of first flow paths.

19. The method of claim 15, wherein for each of the first and second flow paths, the inlet section has a cross-sectional area that is smaller than a cross-sectional area of a respective outlet section associated with the inlet section.

20. The method of claim 15, wherein the outlet section of each of the first flow paths is oriented along a respective first outlet axis that is parallel to but spaced from the respective first inlet axis of a respective inlet section.

* * * * *

UNITED STATES PATENT AND TRADEMARK OFFICE
CERTIFICATE OF CORRECTION

PATENT NO. : 10,711,937 B2
APPLICATION NO. : 15/887659
DATED : July 14, 2020
INVENTOR(S) : Thomas N. Gabriel et al.

It is certified that error appears in the above-identified patent and that said Letters Patent is hereby corrected as shown below:

In the Specification

At Column 3, Line 34, "removed." should be -- removed; --.

At Column 8, Line 35, "4128" should be -- 412B --.

At Column 8, Line 38, "4168" should be -- 416B --.

In the Claims

At Column 12, Line 2, "where in" should be -- wherein --.

Signed and Sealed this
Twenty-seventh Day of August, 2024

Katherine Kelly Vidal
*Director of the United States Patent and Trademark Office*